(12) United States Patent
Sigbjørnsen et al.

(10) Patent No.: US 6,266,416 B1
(45) Date of Patent: Jul. 24, 2001

(54) PROTECTION OF SOFTWARE AGAINST USE WITHOUT PERMIT

(76) Inventors: Sigurd Sigbjørnsen, Tykkåsen 52, N-4870 Fevik; Magne Arild Haglund, Gunder Danielsens Vei 53; Vladimir A. Oleshchuk, Landgraffs vei 20, both of N-4890 Grimstad, all of (NO)

(*) Notice: Subject to any disclaimer, the term of this patent is extended or adjusted under 35 U.S.C. 154(b) by 0 days.

(21) Appl. No.: 08/983,461
(22) PCT Filed: Jul. 10, 1996
(86) PCT No.: PCT/NO96/00171
  § 371 Date: May 4, 1998
  § 102(e) Date: May 4, 1998
(87) PCT Pub. No.: WO97/03398
  PCT Pub. Date: Jan. 30, 1997

(30) Foreign Application Priority Data

Jul. 13, 1995 (NO) .................................................... 952795

(51) Int. Cl.[7] .................................................... H04L 9/00
(52) U.S. Cl. ................... 380/255; 380/277; 380/278; 380/201; 380/28
(58) Field of Search ........................ 380/4, 25, 200–201, 380/255–258, 28–30, 277–278; 360/60; 365/185.01

(56) References Cited

U.S. PATENT DOCUMENTS

| | | | |
|---|---|---|---|
| 4,799,258 | * 1/1989 | Davies | 380/21 |
| 5,319,705 | * 6/1994 | Halter et al. | 380/4 |
| 5,337,357 | 8/1994 | Chou | 380/4 |
| 5,343,527 | * 8/1994 | Moore | 380/4 |
| 5,398,285 | 3/1995 | Borgelt et al. | 380/30 |

FOREIGN PATENT DOCUMENTS

| | | | |
|---|---|---|---|
| 42 39 865 A1 | 6/1994 | (DE) | G06F/12/14 |
| 44 19 115 A1 | 10/1994 | (DE) | G06F/12/14 |
| 0 266 748 A2 | 5/1988 | (EP) | G06F/1/00 |
| 0 266 748 A3 | 4/1991 | (EP) | G06F/1/00 |
| 0 478 969 A2 | 4/1992 | (EP) | G06F/1/00 |
| 0 478 969 A3 | 8/1993 | (EP) | G06F/1/00 |
| 0 266 748 B1 | 2/1995 | (EP) | G06F/1/00 |
| 0 478 969 B1 | 12/1996 | (EP) | G06F/1/00 |
| 2 163 577 | 2/1986 | (GB) | G06F/12/14 |

OTHER PUBLICATIONS

Bruce Schneier, Applied Cryptography, John Wiley & Sons, Inc. (pp. 4–5), Oct. 1995.*

"Applied Cryptography", Bruce Schneier, John Wiley & Sons, p. 4–5, Jan. 1996.*

* cited by examiner

Primary Examiner—Thomas R. Peeso
Assistant Examiner—Todd Jack
(74) Attorney, Agent, or Firm—Sterne, Kessler, Goldstein & Fox P.L.L.C.

(57) ABSTRACT

An arrangement to protect software, particularly freely distributed application software, against utilization without permission of the copyright holder. By encrypting the software employing a key (k1) which is different from that key (k2) which is employed in the decryption, better protection is obtained against unauthorized utilization when the decryption key is kept secret to the user. Further improved security is achieved by additionally executing scrambling-descrambling of the communication between the computer in which the software is utilized and the external unit in which the decryption key is stored. Also, the external unit is arranged such that it returns to the host computer, the result from its processing of data received from the host, the result then being utilized in the further execution of the respective program.

30 Claims, 12 Drawing Sheets

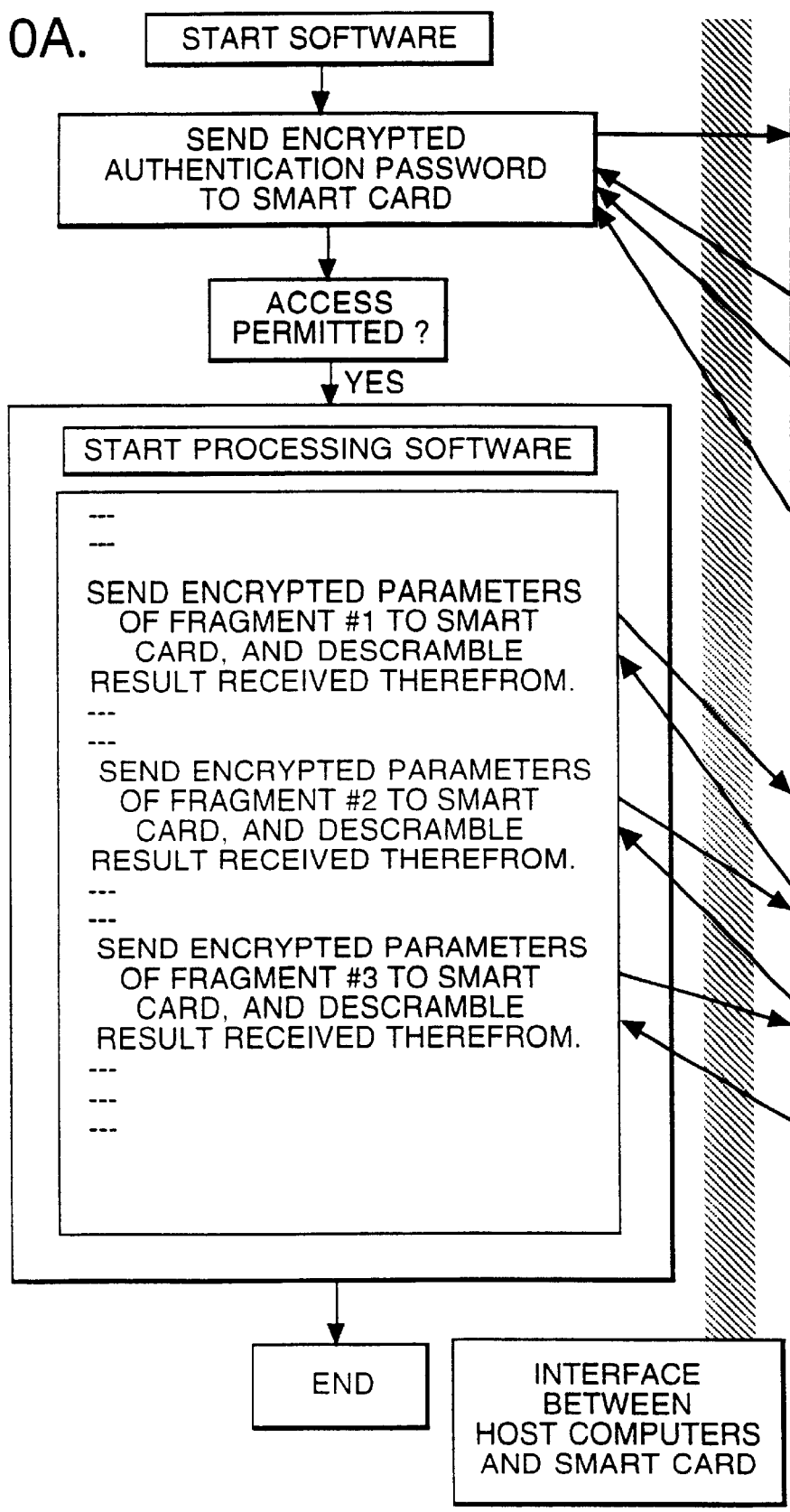

PROTECTION OF SOFTWARE AGAINST USE WITHOUT PERMIT

TECHNICAL FIELD

Present invention relates to the protection of software, in particular freely distributed application software, against use without permission of the copyright holder; and concerns in particular a method of preventing unauthorized utilization of software in a computer; a method and device for preparing software for the utilization in a computer only with a corresponding authorization; and a method and device for allowing authorized utilization of software in a computer which has been prepared according to an aspect of the invention.

Piracy copying of software, particularly software adapted to run on personal computers, is an extensive problem to software vendors which annually costs them large amounts of money. The conventional methods employed to protect software against unauthorized utilization by demanding a password for the installation or operation of a specific computer program or program package, for example, have not provided sufficient security. Thus, an arrangement making it possible to use a certain computer program or a computer program package only if the permission of the copyright holder really exists would be of great importance.

BACKGROUND ART

Several attempts have already been made to establish arrangements in which simply typing the required password is not sufficient to gain access to a program. For example, systems have been proposed which require that a special hardware unit is connected to the computer to make it possible to utilize a given program. This unit may take the form of a blind plug (also termed "dongle"), for example, which is connected directly to one of the input-output terminals of the computer, and containing fixed tables, identity number, or the like, stored in an internal memory from which information is read upon the request of a programmed additional routine included for this purpose in the application program in question. The unit may also take the form of a card reader station, or the like, in which a card is inserted, the matter stored on the card in principle being similar to that of the blind plug above. Usually the checking procedure involves that the additional routine of the program makes a direct comparison of the program identity, for example, and a corresponding item of information present in the stored table.

An example of such an arrangement is described in published DE patent application no. 44 19 115 wherein the matter stored in a chipcard is read, and if the expected content exists, this fact is regarded as being sufficient proof of identity for the use of the program. The checking may be done when a program is installed, or during the utilization thereof. Published DE patent application no. 42 39 865 discloses a similar system which in addition provides an arrangement by which the number of software installations performed are noted, making it possible to limit the number thereof.

The additional routine which must be included in the software constitutes the main disadvantage of all such known devices. By simply removing such routines the software will operate normally, and the protection against unauthorized utilization would be lost. Also, during the exchange of data between the processor of the computer and the memory of the unit or card, it is possible to observe the information, and as the course of this information exchanged is the same each time the program is used, it is possible also to reveal the matter stored in the external memory. Even if the contents of the memory is encrypted in one way or another, such kind of recurrence across the communication interface makes it possible to simulate a corresponding hardware unit, for example, or "break the code" by means of relatively modest computing power.

In the arrangement described in published GB patent application no. 2 163 577 some of the flaws of the above type of hardware units are avoided by employing certain crypto techniques, and by accommodating several storage means as well as a processor of its own in a tamper-proof housing. The processor in the housing makes use of a decryption key which is stored in the housing, and of instructions which also are stored in the housing, to decrypt and execute by itself an encrypted application program or program module transferred from the host computer to which the housing is connected. Regarding the crypto technique itself, the arrangement according to GB patent application no. 2 163 577 uses a so-called DES algorithm (DES—Data Encryption Standard, Bureau of Standards, U.S.A., 1977) for the encryption of the application software, and the corresponding inverse DES algorithm for decrypting the same, whereby one and the same key is used for both the encryption and the decryption. Hence, the DES standard is symmetrical, and the security resides only in the key itself. Therefore, not to give away this security, the encryption also of the DES key itself is proposed in the GB patent application. For this purpose it is used a so-called RSA algorithm (RSA—Rivest, Shamir, Adleman) having two different keys, that is, one for the encryption and another for the decryption, the deduction of one key from the other being practically impossible. Hence, the RSA crypto system is an asymmetric, two-key system (also termed public-key/private-key crypto system), and in the case of the arrangement according to GB patent application no. 2 163 577, one key only is used which, per se, may be known (the public key) to encrypt the DES key while another key which the user must not get to know (the private or secret key) is used to decrypt the DES key. The latter key, i.e. the secret key, is stored in a memory in the tamper-proof housing and is fetched by the processor in the housing when needed to decrypt encrypted DES keys, each of which belonging to an encrypted application program, for the purpose of being able to execute such an application program.

In the arrangement according to GB patent application no. 2 163 577, however, it is also possible to monitor the communication between the external unit and the host computer, and the course of communication is identical each time the same encrypted program module is to be executed. Since complete program modules are encrypted and such modules make up a relatively large part of the software, this kind of predictable recurrence across the communication interface assists in the identification of respective program modules which then easily can be separated from the rest of the software, to be processed, e.g. in off-line mode, for the purpose of decrypting the encrypted program module once and for all. Moreover, external decryption, storage and execution of complete application program modules would take an unacceptably long period of time, unless the circuits in the housing possess a sufficiently high data processing capacity and the communication with the host computer from which the program modules originate, is very fast.

An object of the present invention is to provide a crypto arrangement giving suppliers and/or proprietors of the software an improved possibility of protecting their product against unauthorized utilization, and which does not suffer from the drawbacks of prior art, in such a manner that the software can be copied and distributed without restrictions, but yet not be used unless the necessary permission is present.

A further object of the invention is to provide a crypto arrangement of a universal nature which is able to accommodate not only individual software modules but entire program packages, wherein permission of use may be assigned at different levels, such as for selected parts of a program package.

These and other objects will appear more clearly from the description below of examples of preferred embodiments of the present invention as seen in relation with the accompanying drawings.

DISCLOSURE OF INVENTION

A first general aspect of the present invention relates to a method of preventing unauthorized utilization of software in a computer, the method comprising the steps of:

encrypting at least a part of said software in accordance with a first algorithm, and decrypting the encrypted part of the software in accordance with a second algorithm, the second algorithm together with a key to be employed in the decryption of the encrypted part of the software being stored in an external unit adapted to be connected to said computer, the external unit comprising at least a computer readable storage medium and a processor of its own, the method being characterized in that said decryption in accordance with the second algorithm is executed by employing a second key stored in said external unit, the second key being different from a first key employed in the execution of the encryption of said part of the software in accordance with the first algorithm.

Another aspect of the present invention relates to a method of preparing software, particularly software intended for free distribution, for the utilization in a computer only with a corresponding authorization, the method comprising encrypting in accordance with a first algorithm at least a part of said software which by the utilization in said computer is decrypted in accordance with a second algorithm, the method being characterized in that a key which is employed for said encryption in accordance with the first algorithm, is a first key which is different from a second key which is employed in the execution of the decryption in accordance with the second algorithm of that part of the software which is encrypted in accordance with the first algorithm and first key.

In this second aspect, the invention also relates to a device for the preparation of software, particularly software intended for free distribution, to be utilized in a computer only with a corresponding authorization, the device comprising:

crypto means effecting the encryption of at least a part of said software in accordance with a first algorithm and a first key, and an external unit adapted to be connected to said computer, the external unit at least comprising a processor of its own and a computer readable storage medium for storing a second algorithm and a key, and being disposed to execute decryption of the encrypted part of the software in accordance with said second algorithm and key, the device being characterized in that it further comprises generator means to provide said second algorithm and a second key intended to be employed in said decryption in accordance with the second algorithm, the second key being different from the first key employed by said crypto means in the execution of the encryption of said part of the software in accordance with the first algorithm.

A third aspect of the invention relates to a method of making authorized utilization possible in a computer, of software, particularly freely distributed software, which is prepared according to a mode of the second aspect of the invention, the method comprising connecting an external unit to said computer, the external unit at least comprising a computer readable storage medium and a processor of its own, and a second algorithm and a key to be employed in the decryption of the encrypted part of the software being stored in said external unit. According to the invention the method is characterized in that when the computer in the execution of that part of the software which is encrypted in accordance with the first algorithm encounters a call sequence, or a similar instruction, causing a jump to a corresponding entry point to said added object code, this object code is utilized by the computer to establish a communication channel to the external unit through which channel the encrypted part of the software is transferred in a first transfer session to the external unit to be decrypted by the unit's own processor in accordance with a second algorithm and a second key both of which being stored in said external unit, this second key being different from the first key employed in the execution of the encryption of said part of the software in accordance with the first algorithm, and the decrypted software part then being processed in the external unit and the result transferred in a second transfer session the opposite direction through the communication channel for the further utilization in the computer.

In this third aspect the invention also relates to a device for making authorized utilization of software possible, particularly freely distributed software, prepared by means of a device according to the second aspect of the invention, the device comprising a computer adapted to serve as a host computer for an external unit which at least comprises a processor of its own and a computer readable storage medium, and being intended to be connected to the host computer for the communication therewith. According to the invention this device is then characterized in that said external unit comprises decryption means adapted to execute decryption in accordance with said second algorithm and said second key produced by said generator means, the second key being different from the first key used by said crypto means in the execution of the encryption of said part of the software in accordance with the first algorithm.

By the methods and devices according to the invention an arrangement is achieved which makes it utmost difficult to use software, such as in the form of a computer program or a computer program package, if the permission of the copyright holder does not exist. As it appears from the description below and the other patent claims, this hinderance to the unauthorized use according to the invention may also be made even more secure, so that it may be nearly impossible to utilize software which is processed according to such further features of the invention, if the necessary authorization is missing.

BRIEF DESCRIPTION OF DRAWINGS

In the description below reference is made to appended drawings, on which.

DESCRIPTION OF PREFERRED EMBODIMENTS

Figure 1:
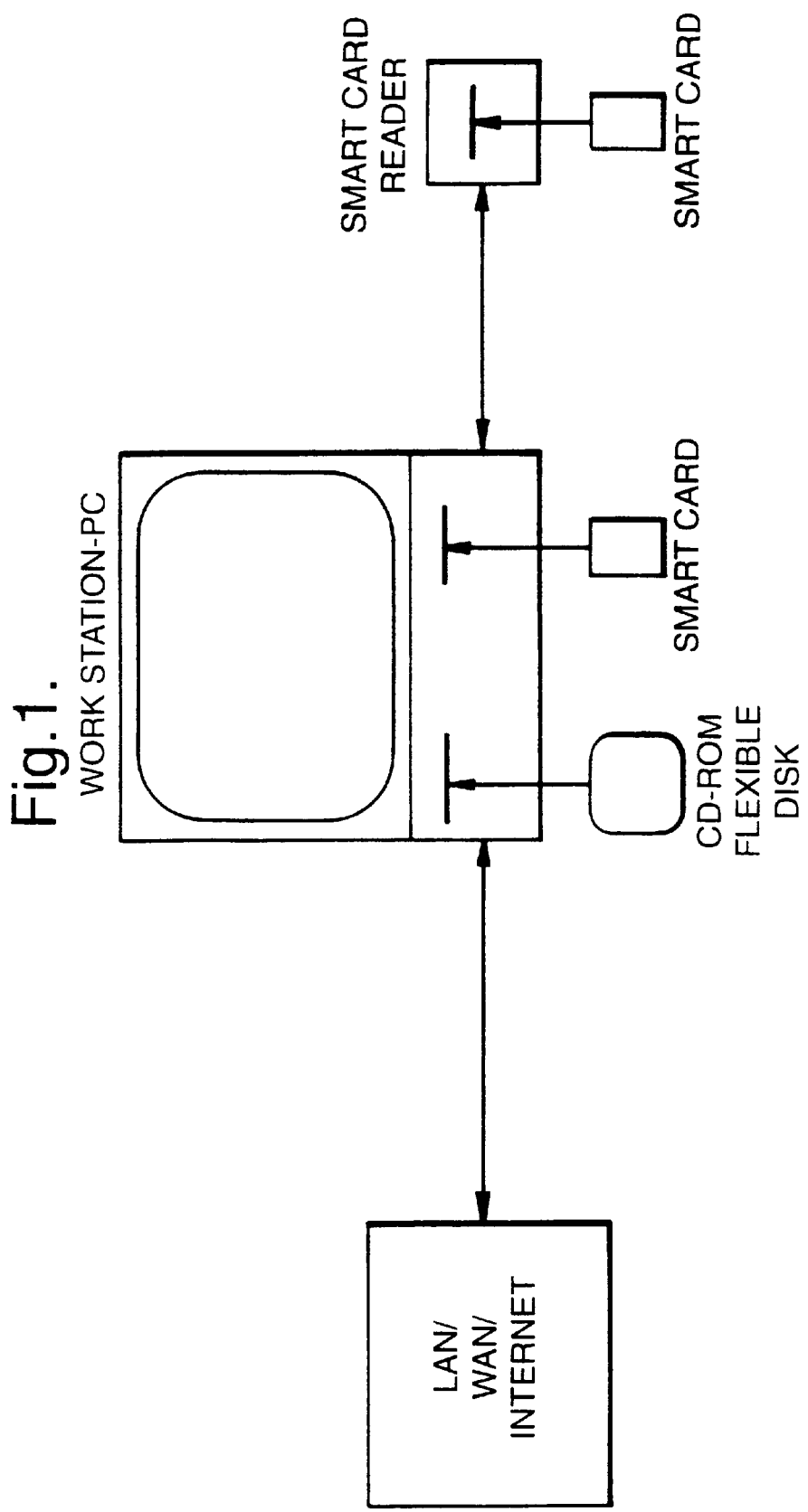
FIG. 1 illustrates a preferred hardware configuration according to the invention.

First it is referred to FIG. 1 which illustrates a preferred hardware configuration of the invention and which shows a computer having the form of a workstation or personal computer (PC) serving as a host computer according to the invention. In the figure, an external unit according to the invention is shown to be in the form of a card reader or processor, particularly for Smart Cards, provided with a commercially available integrated microprocessor, e.g. of the CCA12103 type, the unit being included in the computer shown or disposed in a separate unit of equipment connected to the computer by a serial or parallel connection.

FIG. 1 also illustrates that now the secured software may be distributed through different types of data networks to which the computer may establish a connection, such as wide area networks (WAN), local area networks (LAN), and, in particular, Internet. Also, the software may in deed, as usual, be distributed on flexible disks and/or CD-ROMs (readable only, compact laser disks). In any case, the software may be copied and installed without restrictions.

Since the software is protected against unauthorized utilization, there is no need for any kind of copy protection of the software as the case otherwise often may be. Here, the authorization is embedded in the Smart Card, and it is not available to anyone else but the supplier of the software who himself installs the necessary decryption algorithms and the keys on the card. Hence, the permit to use a certain computer program is found on the card, not in the respective program, or another part of the software.

Figure 2:
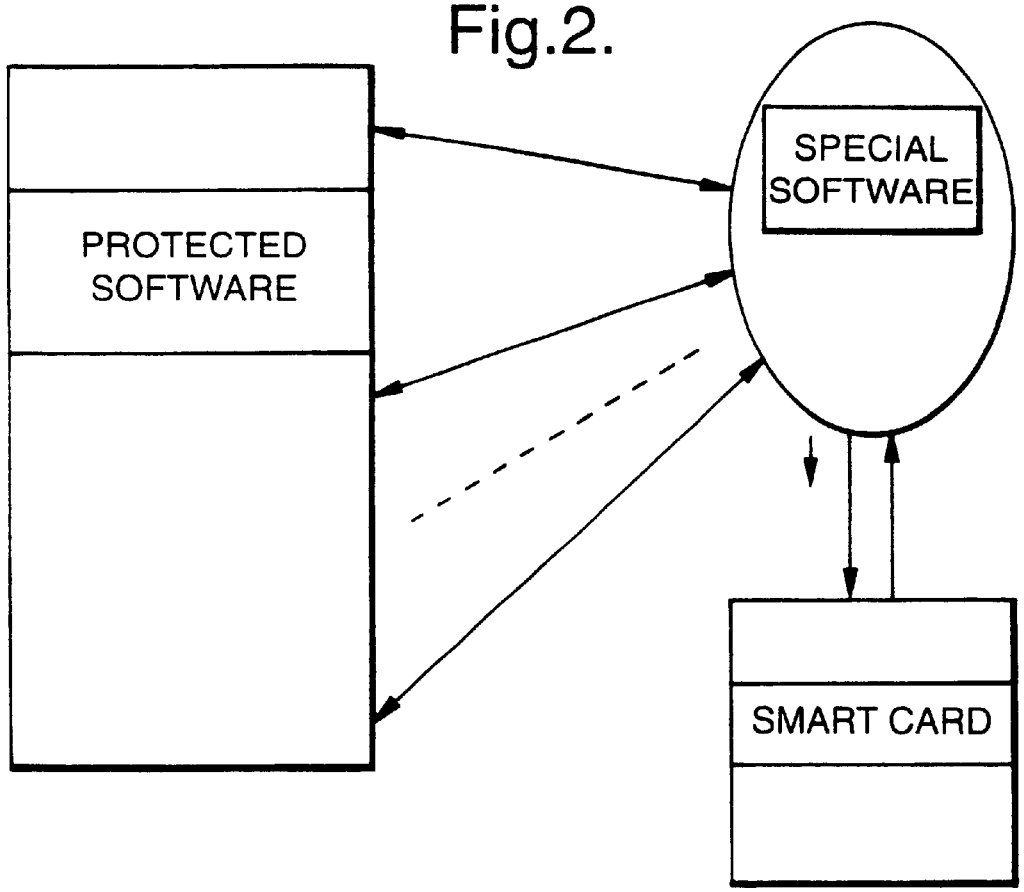
FIG. 2 is a simplified general software diagram according to the invention.

From FIG. 2 showing a simplified general diagram, it appears that an arrangement according to the invention can be seen to comprise:

1. software protected against unauthorized utilization (the protection, however, not interfering with the copying thereof), 2. a Smart Card (or the like) holding the algorithm and the key for the decryption of the software in question, and 3. special software for the communication between the protected software (1) and the Smart Card (2) (i.e. the added object code specified in the claims).

The protection is provided by the insertion, in different locations of the software, of program calls to the Smart Card, or to special software at the disposal to the card, thereby obtaining the information necessary to proceed correctly in the execution of the protected program. For example, this information may be certain parameters which are used when the program is executed, and which is determined by those who wish to protect their software. Because they are necessary for the software to work properly, such program calls cannot be removed.

The interaction of the protected program with the Smart Card is controlled by the special software (object code) entered into the data library of the program when the original program is encrypted. This special software may also provide for scrambling of the communication between the computer and the Smart Card.

Figure 3:
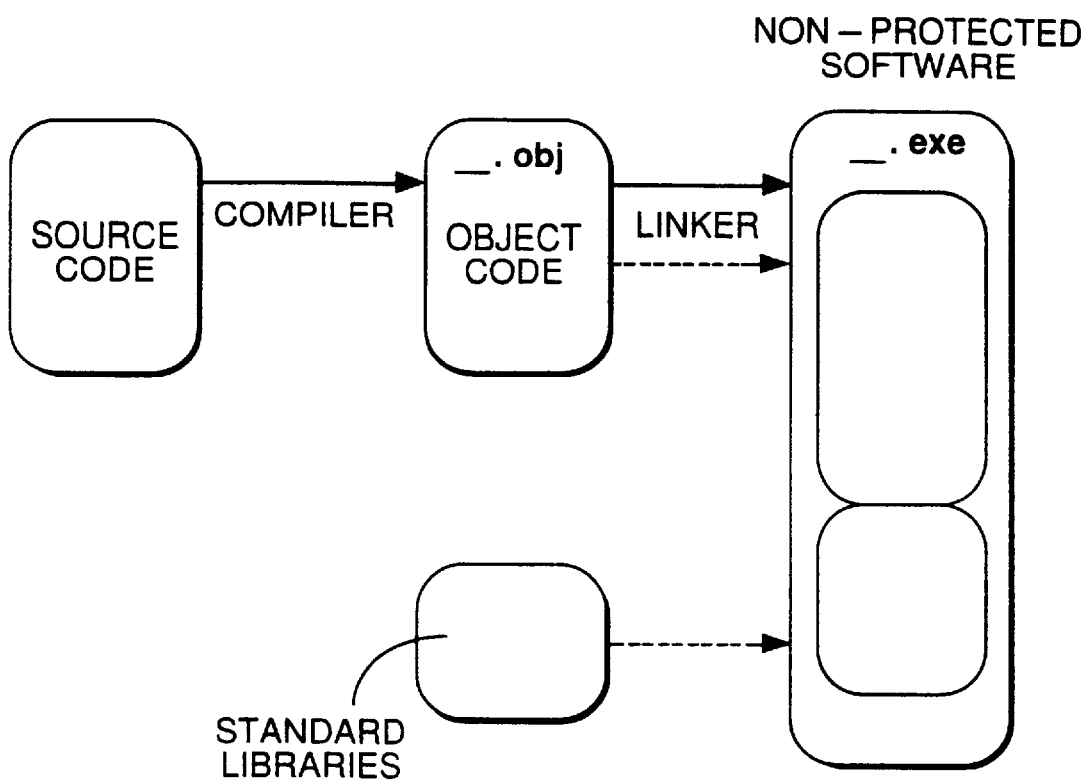
FIG. 3 illustrates schematically how a common command or execution file (.EXE file) is generated without encryption.
Figure 4:
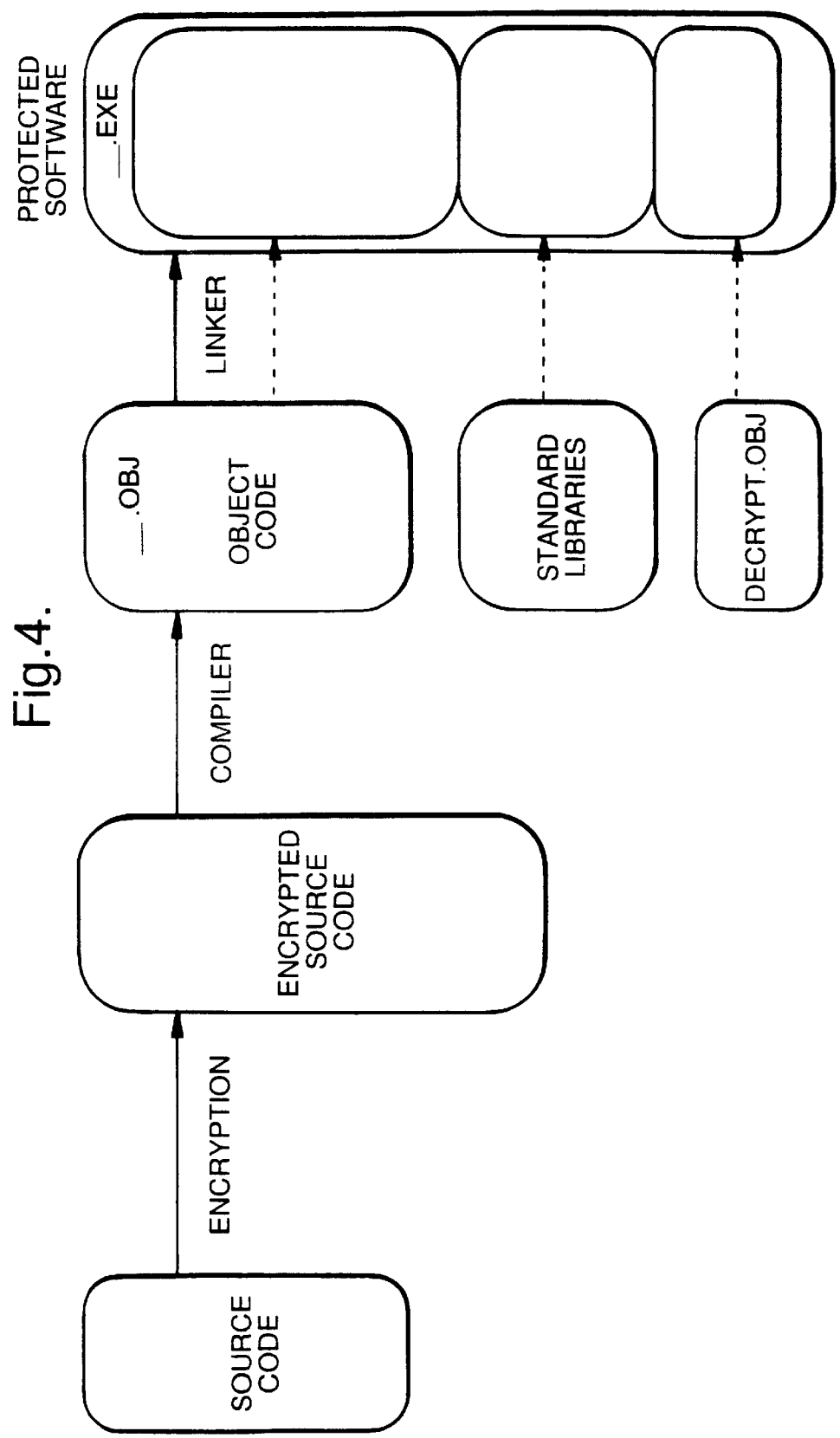
FIGS. 4 and 5 illustrates schematically how encryption on the level of source code can be carried out according to the invention.
Figure 5:
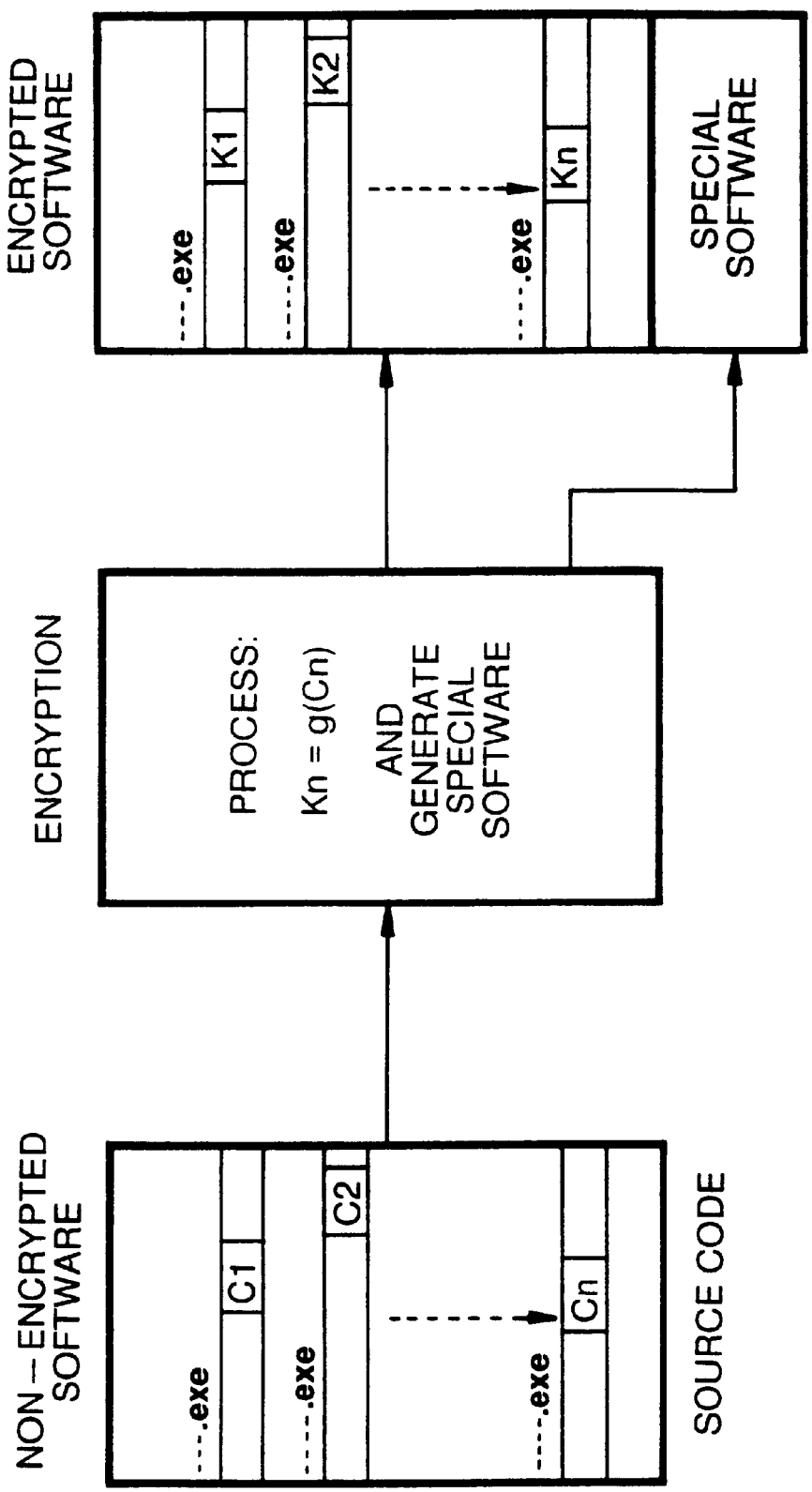

FIG. 3 shows how a common command or execution file (.EXE file) is generated without encryption; and FIGS. 4 and 5, each in their own manner, depict how encryption can be carried out on the source code level according to the invention.

Figure 6:
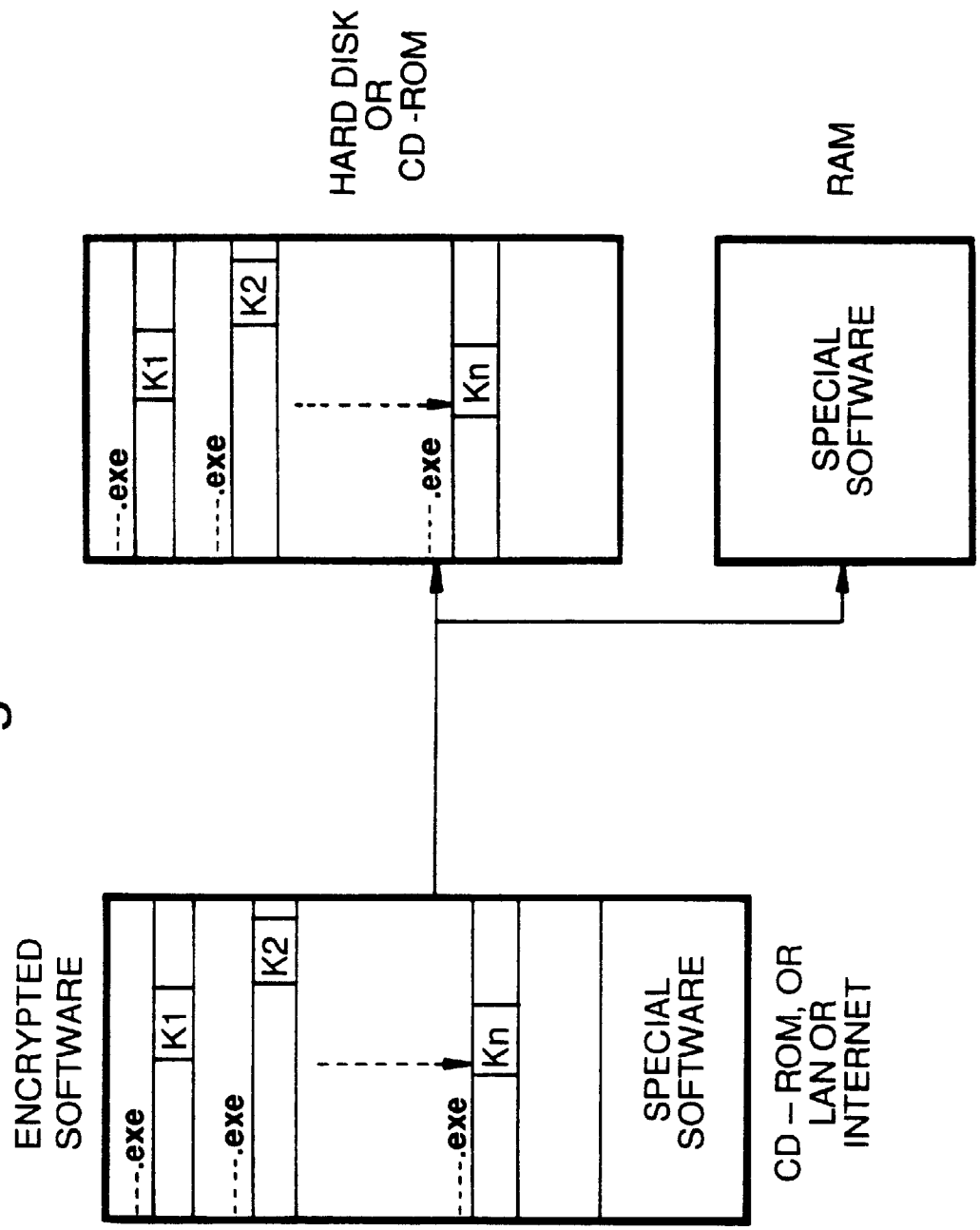
FIG. 6 illustrates schematically the partitioning of software onto a magnetic storage disk and a random access memory (RAM), respectively.

FIG. 6 illustrates that the software itself is placed on a magnetic storage disk, whereas the special program (object code or data library) is supplied to the random access memory (RAM) of the computer.

Figure 7:
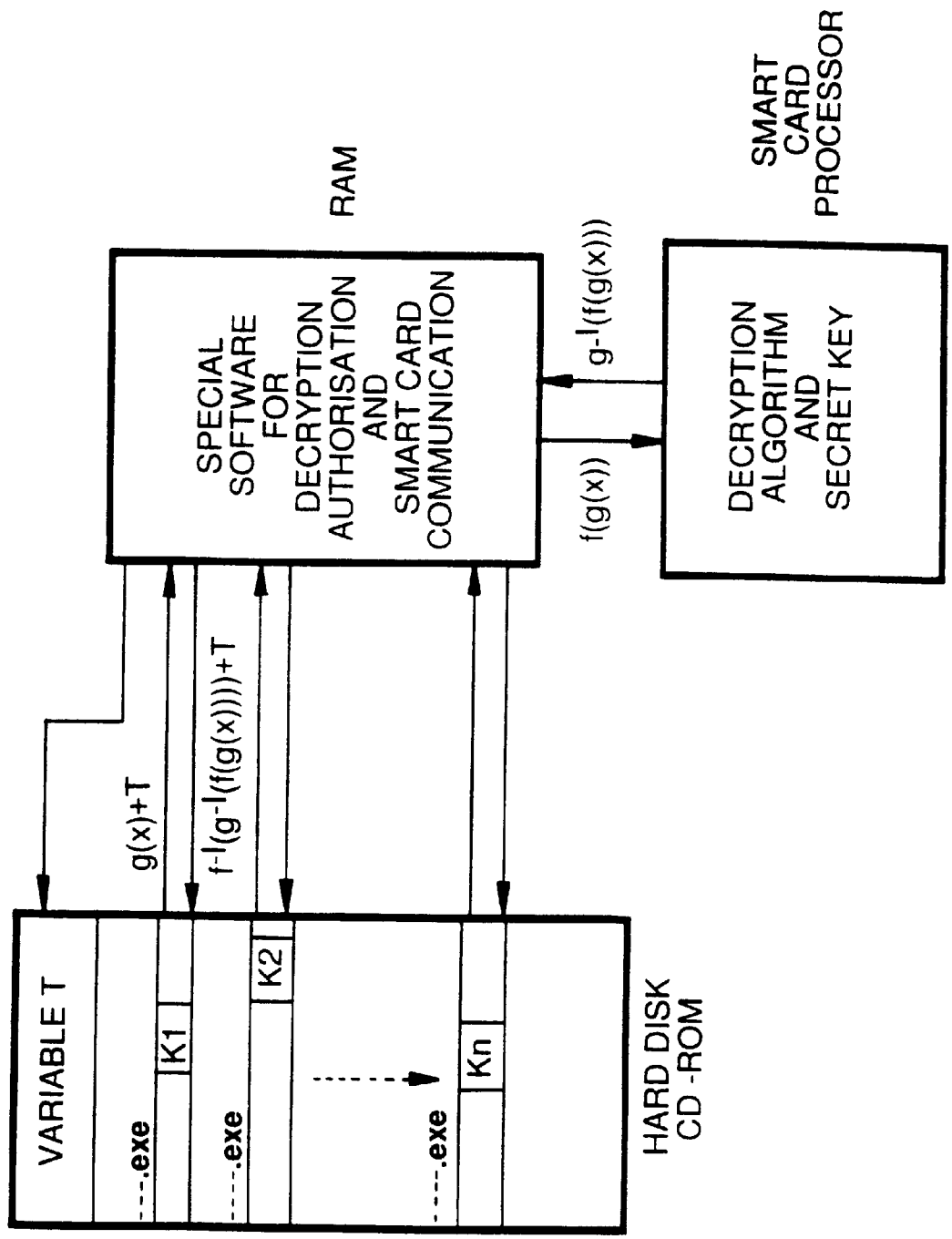
FIG. 7 illustrates schematically the utilization of protected software in a computer.
Figure 9:
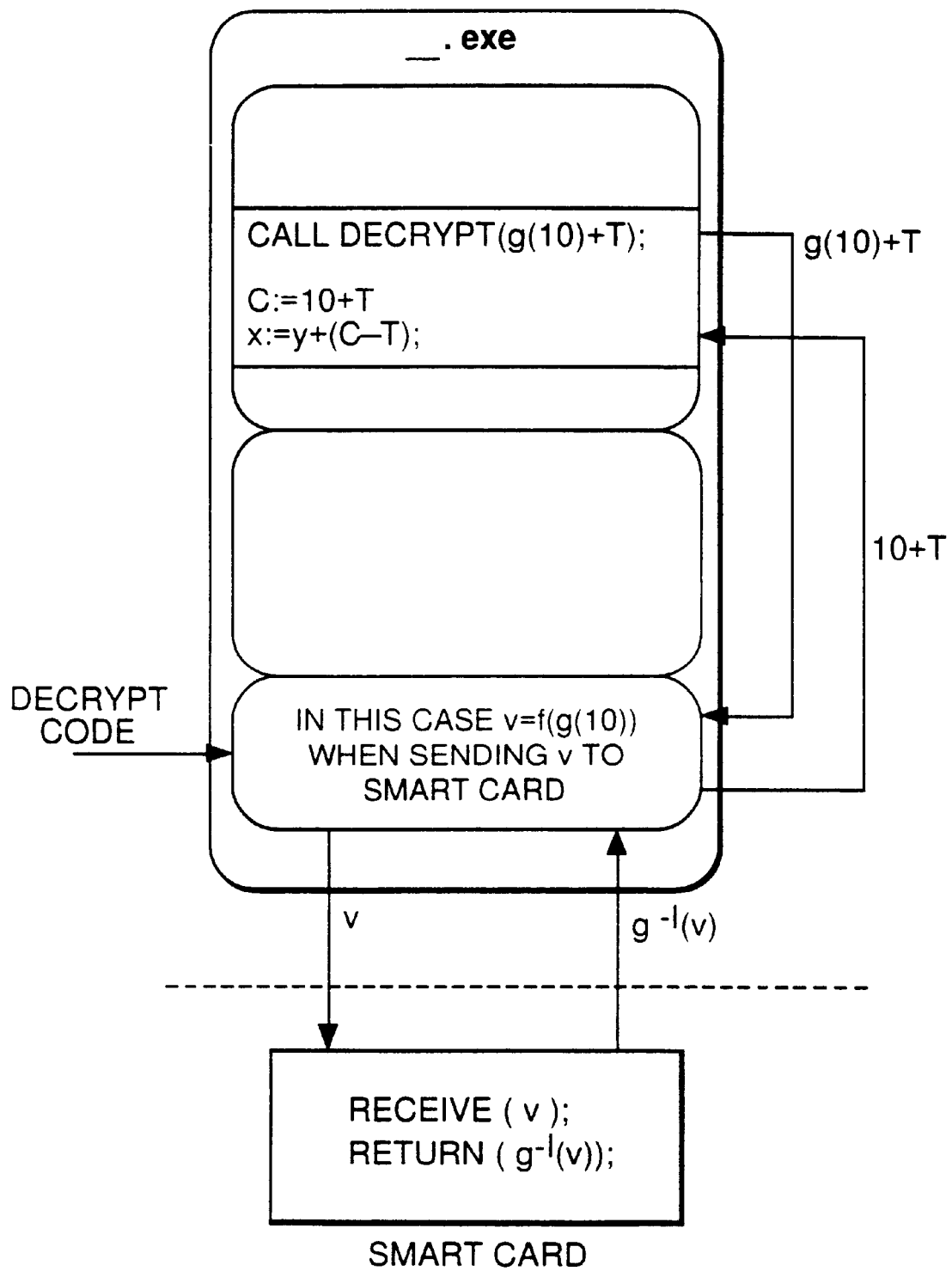
FIG. 9 illustrates schematically the utilization of protected software in a computer.

FIGS. 7 and 9 illustrate such processes which take place when the protected software is utilized in a computer.

Figure 8:
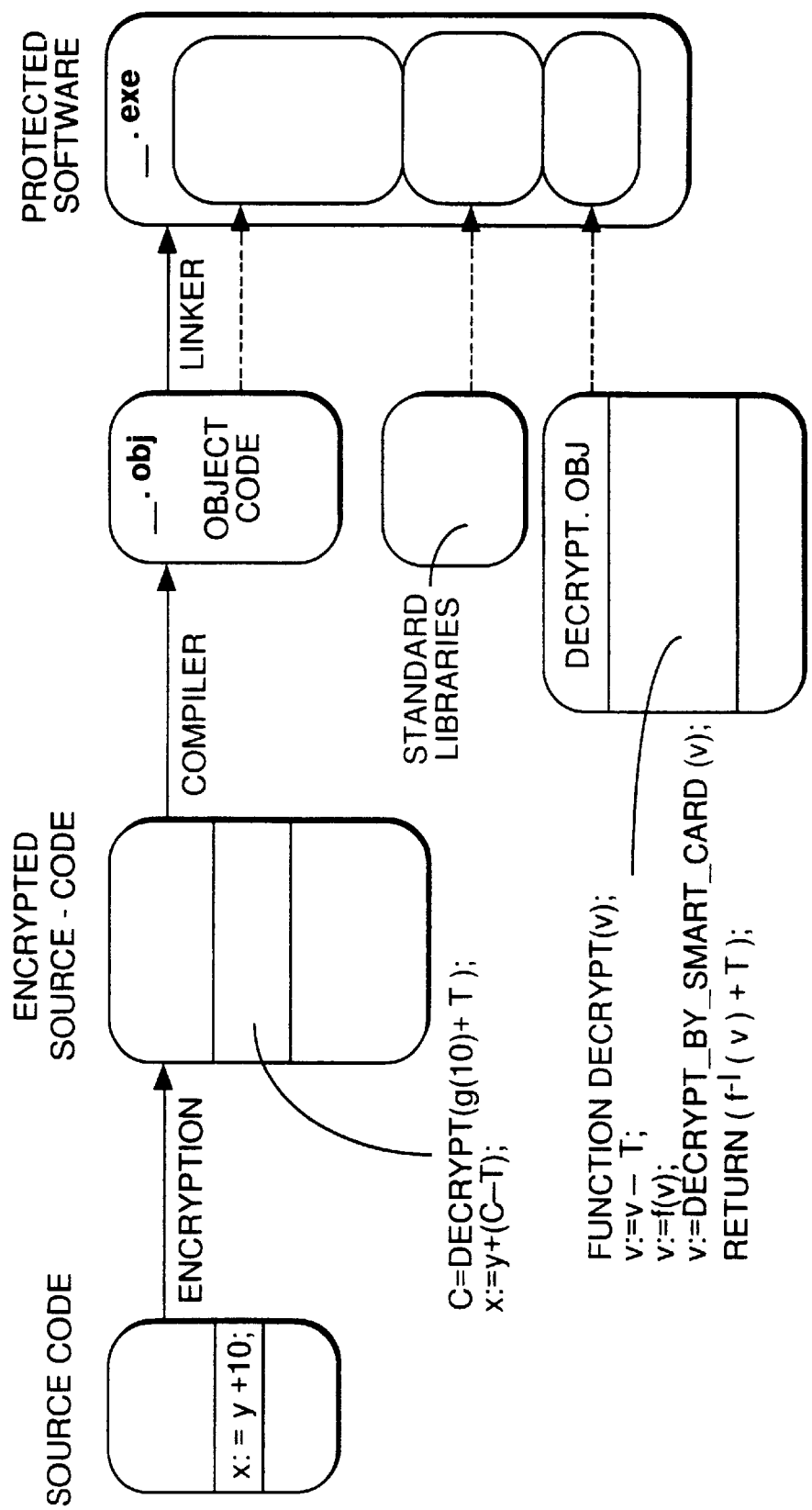
FIG. 8 shows an example of an encryption process of the type shown in FIGS. 4 and 5.

FIG. 8 shows an example of an encryption process of the type shown in FIGS. 4 and 5. Here, it is assumed that the source code is present in a high level programming language, such as Pascal, C, Modula, or the like. It is the source code that is being encrypted and thus protected against so-called unauthorized use. In the source code a few parameters are selected which are encrypted by means of an encryption function g. For example, an expression, x:=y+10, present in a command in the unprotected source code can be represented as:

$$C := \text{decrypt}(g(10)+t),$$

$$x := y+(C-T),$$

where: $g(10)$ is an encrypted parameter, and is a variable, the random value of which, in this case, being fetched from the Smart Card.

To obtain a correct value of x the protected program must "arrive at" a value of C, which must be equal 10+T. The decrypt program is located in the "spesial software" (the added object code) which constitutes a part of the protected software (see FIG. 5). This special software also comprises scrambling and descrambling functions, which here are denoted f and $f^1$, as well programs for the communication with the Smart Card (see FIG. 7). In the communication with the Smart Card, the functions f and $f^1$ employ keys which are fetched from the Smart Card, the Smart Card itself containing:

- a number generator to produce a random value of variable T located in the protected software,
- a secret key for the decryption function $g^{-1}$,
- an algorithm for the decryption function $g^{-1}$, and
- one or more keys for functions f and $f^1$.

It should be noted that it is important that the encryption function g and decryption function $g^{-1}$ represent a public key crypto system not being symmetric. This means that the encryption function g employs a public key which may be known, this key, however, not being sufficient to arrive at the decryption function $g^{-1}$ (neither its algorithm, nor its key).

Thus, the algorithm and key for the decryption function $g^{-1}$ is placed on the Smart Card, from which they are never transmitted.

It is required that the functions f, $f^1$, g, $g^{-1}$ are commutative (i.e. they are interchangeable without altering value). Here this means that they must have the following property:

$$f^1(g^{-1}(f(g(x))))=x.$$

Upon the utilization in a computer of a program protected in this way, the execution of the program starts as usual (FIG. 7). Through the communication with the Smart Card a value of variable T and the keys for functions f og $f^1$ are entered into the software. The execution of the program then continues as usual. At the moment the execution reaches an encrypted parameter ((g(10) in the example shown) the value (g(10)+T)) is sent to the special software which further conveys f(g(10)+T)−T) to the Smart Card. In the Smart Card, the value of $g^{-1}((10)+T)−T)$ is calculated, and this value is returned to the special software. By means of the special software $f^1(g^{-1}((10)+T)−T)))$ is then calculated, this being equal to x and x+T; and this result is supplied to the protected program as parameter C for the utilization in the program.

Having this kind of encryption-decryption arrangement according to the invention, the following advantages and possibilities are realized:

Great flexibility by the use of Smart Cards.

The licensing of Smart Cards (i.e. users) can be provided by the importers or agents engaged by software producers. A Smart Card may then contain licenses, or permissions, at several levels for various software packages which have the same authentication format and algorithms.

A first level of encryption employing an unsymmetric, dual key encryption arrangement (public key/private key crypto system), such as the RSA crypto system, whereby the public key is available only to the software producer, and the private key is a secret key which the manufacturer of the Smart Card enters into the read only memory (ROM) of the Smart Card according to specifications given by the software producer. The private key may be different for each program package.

An unsymmetric, encrypted authentication key which is transferred to the Smart Card when the running of protected software begins and which is decrypted in the Smart Card by means of a private key no. 0 to initiate an authentication process in the Smart Card.

Encryption at the level of source code, making the arrangement independent of the operating system. By encrypting small parts, or fragments, only of files, such as of command files, it is difficult to identify those parts of the software being encrypted for the purpose of attacking such parts in one way or another. Also, the decryption algorithms and keys are easily entered onto the Smart Card.

A second level of encryption whereby the communication between the host computer and Smart Card is such that it becomes difficult to trace anything making sense from that communication by the logging thereof. The algorithms to be employed are located both in the protected software and the Smart Card, and both the encryption keys and the decryption keys are located in the Smart Card, i.e. hidden to the user. The encryption algorithm and key may be different for various types of software.

Figure 10B:
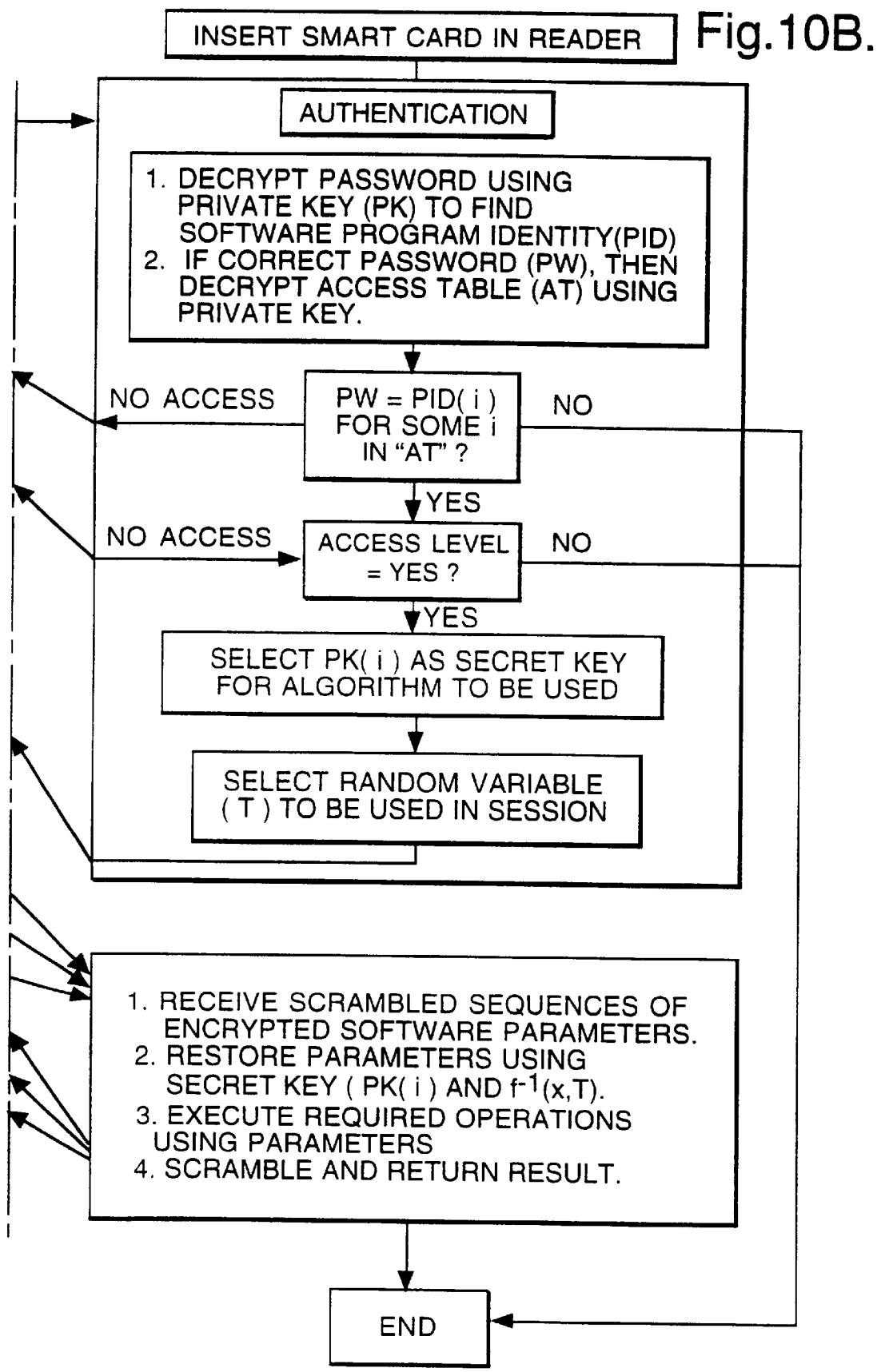
FIG. 10 illustrates schematically an application area including access checking or authentication.

FIG. 10 serves to demonstrate that the application area of the arrangement according to the invention is extendable also to cover access checking, or authentication, for example, as further possibilities also may exist. In such an embodiment of the invention, the software to be protected may be provided with an authentication key encrypted by employing a so-called public key and an identification number for the software package in question. Then, the external unit, such as the Smart Card, would contain decryption algorithms which preferably are mask programmed, and a private key no. 0 (in the ROM) to be used to decrypt the authentication key, as well as an access or authentication table which may be configured as the table shown below.

| PID (Program I.D. No.) | AcL (Access Level) | PK (Private Key) |
|---|---|---|
| PID (1) | AcL (1) | PK (1) |
| PID (2) | AcL (2) | PK (1) |
| PID (3) | AcL (3) | PK (3) |
| ... | ... | ... |
| PID (n) | AcL (n) | PK (n) |

In the table, PID denotes the identity number of the software, such that different programs are assigned dissimilar identity numbers which also may contain the version number of the respective software products, or the like, for example. AcL denotes the access level or status, such as:

two different levels, namely access permitted and access not permitted, a limited number of times the respective program can be run, a time limit for the use of a program, e.g. a permission expiration date, access to a shortened variant only of the program, e.g. a so-called demo-varant.

The entries in the access level column, AcL, of the table are amendable by the importer or agent of the software product, for example.

In the private key column, PK, the software producer specifies the secret keys to be employed in the decryption of the encrypted fragments dependent on the identity number, PID, of the software. The secret keys are mask programmed in the Smart Card and are not available to anyone else.

Figure 11:
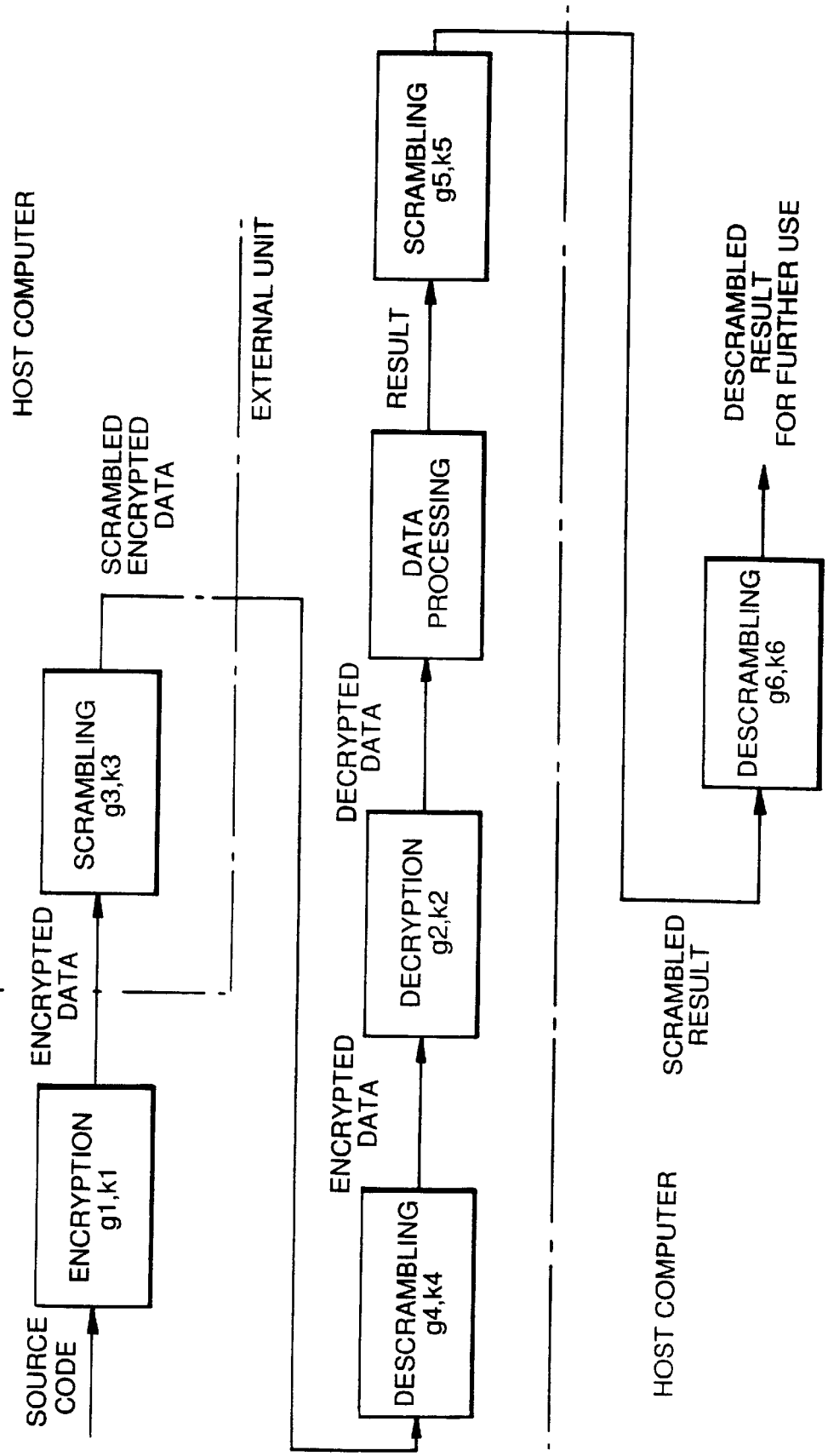
FIG. 11 is a flow chart schematically illustrating a course of processes including encryption-decryption and scrambling-descrambling according to a preferred embodiment of the invention.

FIG. 11 is a flow chart schematically illustrating a principally complete course of processes according to a preferred embodiment of the invention, the steps being:

encryption of the source code (g1, k1), scrambling of the encrypted data (g3, k3), transfer of the scrambled encrypted data to the external unit and descrambling thereof (g4, k4), decryption of the transferred and descrambled data (g2, k2), processing of the decrypted data, and scrambling of the result (g5, k5), transfer of the scrambled result to the host computer and descrambling thereof (g6, k6), and output of the decrypted result for further utilization.

In the examples shown of embodiments of the invention, a Smart Card constitutes the preferred implementation of the external units indicated in the claims below. This is quite simply because the Smart Card technology is considered as being the most "tamper-proof" protection of the algorithms, keys, a.s.o., which necessarily have to be stored in the external unit, or in a separate article, according to the annexed claims. The small number of manufacturers of such cards in the world, and i.a. the large values being at disposal by the use of such cards, in particular cards having the form of payment transaction cards, contribute strongly to the fact that the knowledge required to falsify such Smart Cards, will not be readily available to persons having dishonest intentions. However, this does not impede a possible development of new techniques which may be just as well, or better, suited for the purpose of the present invention. Therefore, the patent claims are meant also to cover such future external units and separate articles indicated in the claims which may provide at least the same degree of security as the smart card now preferred.

What is claimed is:

1. A method of preventing unauthorized utilization of software in a computer, the method comprising the steps of:

encrypting only a part of the software in accordance with a first algorithm (g1), wherein said first algorithm uses a public first key (k1); and decrypting said encrypted part of the software in accordance with a second algorithm (g2), said second algorithm (g2) together with a private second key (k2) to be employed in said decryption of said encrypted part of the software being stored in an external unit adapted to be connected to the computer, said external unit comprising at least a computer readable storage medium and a processor of its own, wherein said private second key (k2) is different than said public first key (k1) employed in said encryption.

2. A method according to claim 1, wherein said encryption of said part of the software in accordance with said first algorithm (g1) is executed on the source code of the software prior to compiling and linking, or during similar processing steps producing an executable program, and at the same time adding to the data library of said executable program an object code associated with said external unit.

3. A method according to claim 2, wherein said decryption of said encrypted part of the software which is executed in accordance with said second algorithm (g2), takes place when the computer in said execution of the software encounters a call sequence, or a similar instruction, causing a jump to a corresponding entry point to said object code, whereby a communication channel is established between the computer and said external unit by utilization of said object code, through which communication channel said encrypted part of the software is transferred in a first transfer session to said external unit to be decrypted by said external unit's own processor, said decrypted software part then being processed in said external unit and a result transferred in a second transfer session the opposite direction through said communication channel for the further utilization in the computer.

4. A method according to claim 3, wherein the method further comprises:

a step wherein said part of the software which is encrypted in accordance with said first algorithm (g1), prior to said first transfer session, is caused to be scrambled according to a third algorithm (g3) and a third key (k3), said third key (k3) being based on a number which, for the respective transfer session, is selected randomly and preferably produced by said external unit, and a step wherein said part of the software which is encrypted in accordance with said first algorithm (g1), and which is scrambled according to said third algorithm (g3) and transferred to said external unit in said first transfer session, is caused to be descrambled in said external unit in accordance with a fourth algorithm (g4) and a fourth key (k4), said fourth key (k4) being based on said randomly selected number for said third key (k3), and said fourth algorithm (g4) being the inverse algorithm of said third algorithm (g3).

5. A method according to claim 4, wherein the method further comprises:

a step wherein said result produced in said external unit on the basis of said part of the software which is decrypted in accordance with said second algorithm (g2), prior to said second transfer session, is caused to be scrambled according to a fifth algorithm (g5) and a fifth key (k5), said fifth key (k5) being based on a number which, for the respective transfer session, is randomly selected and preferably provided by said external unit, and a step wherein said result produced in said external unit on the basis of said part of the software which is decrypted in accordance with said second algorithm (g2), and which is scrambled according to said fifth algorithm (g5) and transferred to the computer in said second transfer session, is caused to be descrambled in the computer in accordance with a sixth algorithm (g6) and a sixth key (k6), said sixth key (k6) being based on said randomly selected number for said fifth key (k5), and said sixth algorithm (g6) being the inverse algorithm of said fifth algorithm (g5).

6. A method according to claim 5, wherein said randomly selected number for said third and fourth keys (k3, k4) and said randomly selected number for said fifth and sixth keys (k5, k6) are the same number.

7. A method of preparing software for the utilization in a computer only with a corresponding authorization, the method comprising:

encrypting in accordance with a first algorithm (g1) only a part of the software;

transferring the software encrypted using said first algorithm (g1) to an external unit connected to the computer;

decrypting within said external unit the software encrypted using said first algorithm (g1) in accordance with a second algorithm (g2), wherein a key which is employed for said encryption in accordance with said first algorithm (g1), is a public first key (k1) which is different from a private second key (k2) which is employed in the execution of said decryption in accordance with said second algorithm (g2) of that part of the software which is encrypted in accordance with said first algorithm (g1) and said public first key (k1).

8. A method according to claim 7, wherein said encryption of said part of the software in accordance with said first algorithm (g1) is executed on the source code of said software prior to compiling and linking to an executable program, or in similar processing steps producing an executable program, and at the same time adding an object code to the data library of said executable program associated with said external unit.

9. A method according to claim 8, wherein said compiling and/or linking of the source code of an executable program, or in similar processing steps producing an executable program, call sequences, or similar instructions, are inserted which in the execution in the computer of said executable program causes a jump to a corresponding entry point to said object code, said object code being used to establish a communication channel between the computer and said external unit in which said decryption takes place in accordance with said second algorithm (g2).

10. A method according to claim 9, further comprising a step wherein a third key (k3) is inserted in said part of the software which is encrypted in accordance with said first algorithm (g1), said third key (k3) being intended to be employed in a third algorithm (g3) for the scrambling of said part of the software prior to its transfer to said external unit.

11. A method of making authorized utilization possible in a computer of software prepared for utilization in the computer only with a corresponding authorization, the method comprising:

encrypting in accordance with a first algorithm (g1) only a part of the software which by the utilization in the computer is decrypted in accordance with a second algorithm (g2), wherein a key which is employed for said encryption in accordance with said first algorithm (g1), is a public first key (k1) which is different from a private second key (k2) which is employed in decryption in accordance with said second algorithm (g2) of said part of the software which is encrypted in accordance with said first algorithm (g1) and said public first key (k1), said encryption of said part of the software in accordance with said first algorithm (g1) is executed on the source code for the software prior to compiling and linking to an executable program, or in similar processing steps producing an executable program, and at the same time adding an object code to the data library of said executable program associated with an external unit adapted to be connected to the computer, and said compiling and/or linking of said source code to an executable program, or in similar processing steps producing an executable program, call sequences, or similar instructions, are inserted which in the execution in the computer of said executable program causes a jump to a corresponding entry point to said object code, said object code being used to establish a communication channel between the computer and said external unit in which said decryption takes place in accordance with said second algorithm (g2);

connecting said external unit to the computer, said external unit comprising a computer readable storage medium and a processor, said second algorithm (g2) and a said private second key k2 to be employed in said decryption of said encrypted part of the software being stored in said external unit; and when the computer in the execution of said part of the software which is encrypted in accordance with said first algorithm (g1) encounters a call sequence, or a similar instruction, causing a jump to a corresponding entry point to said object code, said object code is utilized by the computer to establish a communication channel to said external unit through which communication channel said encrypted part of the software is transferred in a first transfer session to said external unit to be decrypted by said processor of said external unit in accordance with said second algorithm (g2) and said private second key (k2) both of which being stored in said external unit, said second key (k2) being different from said public first key (k1) employed in the execution of said encryption of said part of the software in accordance with said first algorithm (g1), and said decrypted software part then being processed in said external unit and a result transferred in a second transfer session in the opposite direction through said communication channel for the further utilization in the computer.

12. A method according to claim 11, wherein a third key (k3) is inserted in said part of the software which is encrypted in accordance with said first algorithm (g1), said third key (k3) being intended to be employed in a third algorithm (g3) for the scrambling of said part of the software prior to its transfer to said external unit, the method further comprising:

prior to said first transfer session to said external unit, said part of the software which is encrypted in accordance with said first algorithm (g1) is caused to be scrambled according to said third algorithm (g3) and said third key (k3), said third key (k3) being based on a number randomly selected for the respective transfer session and provided by said external unit, and said part of the software which is encrypted in accordance with said first algorithm (g1), and which is scrambled according to said third algorithm (g3) and transferred to said external unit in said first transfer session, is caused to be descrambled in said external unit in accordance with a fourth algorithm (g4) and a fourth key (k4), said fourth key (k4) being based on said randomly selected number for said third key (k3), and said fourth algorithm (g4) being the inverse algorithm of said third algorithm (g3).

13. A method according to claim 12, wherein the method further comprises:

a step wherein said result produced in said external unit on the basis of said part of the software which is decrypted in accordance with said second algorithm (g2), prior to said second transfer session, is caused to be scrambled according to a fifth algorithm (g5) and a fifth key (k5), said fifth key (k5) being based on a randomly selected number for the respective transfer session and preferably provided by said external unit, and a step wherein said result produced in said external unit an the basis of said part of the software which is decrypted in accordance with said second algorithm (g2), and which is scrambled according to said fifth algorithm (g5) and transferred in said second transfer session to the computer, is caused to be descrambled in the computer in accordance with a sixth algorithm (g6) and a sixth key (k6), said sixth key (k6) being based on said randomly selected number for said fifth key (k5), and said sixth algorithm (g6) being the inverse algorithm of said fifth algorithm (g5).

14. A method according to claim 1, wherein said first algorithm (g1), said second algorithm (g2), said public first key (k1) and said private second key (k2) are determined in accordance with an RSA crypto system.

15. A method according to claim 1, wherein said part of the software to be encrypted in accordance with said first algorithm (g1) is selected by being required for the use of the software by the computer, and comprising one or more instructions in a command or execution file, such as in a .COM or .EXE file.

16. A device for the preparation of software to be utilized in a computer only with a corresponding authorization, the device comprising:

crypto means effecting the encryption of only a part of the software in accordance with a first algorithm (g1) and a public first key (k1), and an external unit adapted to be connected to the computer, said external unit comprising a processor and a computer readable storage medium for storing a second algorithm (g2) and a private second key (k2), and being disposed to execute decryption of said encrypted part of the software in accordance with said second algorithm (g2) and said private second key (k2,)

wherein the device further comprises generator means to provide said second algorithm (g2) and said private second key (k2) intended to be employed in said decryption in accordance with said second algorithm (g2), said private second key (k2) being different from said public first key (k1) employed by said crypto means in the execution of said encryption of said part of the software in accordance with said first algorithm (g1).

17. A device according to claim 16, wherein said crypto means is adapted to execute said encryption of said part of the software in accordance with said first algorithm (g1) on source code of the software before it is compiled and linked, or in any other way is transformed to an executable program, and that said crypto means at the same time effects the addition to the data library of said executable program, of an object code associated with said external unit.

18. A device according to claim 17, wherein said crypto means is adapted to insert during said compiling and/or linking of said source code to an executable program, or during a similar processing producing an executable program, call sequences, or similar instructions, which in the execution of said executable program in the computer provide for a jump to a corresponding entry point to said object code which the computer then utilizes to establish a communication channel to said connected external unit.

19. A device according to claim 18, wherein said crypto means is adapted to enter into said part of the software which is encrypted in accordance with said first algorithm (g1), a third key (k3) intended to be employed in a third algorithm (g3) for scrambling of said part of the software prior to its transfer to said external unit.

20. A device for making authorized utilization of software in a computer possible comprising:

a device including crypto means for effecting the encryption of only a part of the software in accordance with a first algorithm (g1) and a public first key (k1), and an external unit adapted to be connected to the computer, said external unit comprising a processor and a computer readable storage medium for storing a second algorithm (g2) and a private second key (k2), and being disposed to execute decryption of said encrypted part of the software in accordance with said second algorithm (g2) and said private second key (k2), and generator means to provide said second algorithm (g2) and said private second key (k2) intended to be employed in said decryption in accordance with said second algorithm (g2), said private second key (k2) being different from said public first key (k1) employed by said crypto means in the execution of said encryption of said part of the software in accordance with said first algorithm (g1), said device comprising a computer adapted to serve as a host computer for said external unit, wherein said external unit comprises decryption means adapted to execute decryption in accordance with said second algorithm (g2) and said private second key (k2) produced by said generator means.

21. A device according to claim 20, wherein said decryption means is adapted to execute said decryption in accordance with said second algorithm (g2) when said host computer in the execution of said part of the software which is encrypted in accordance with said first algorithm (g1) encounters a call sequence, or the like, which provides for a jump to a corresponding entry point to said object code, whereby said host computer then uses said object code to establish a communication channel to said external unit through which said host computer effects that said encrypted part of the software is transferred in a first transfer session to said external unit and subjected to said decryption, and that said external unit's own processor is adapted to process said decrypted part of the software and effect that a result is transferred the opposite direction in a second transfer session through said communication channel for the further utilization of said result in the computer.

22. A device according to claim 21, wherein said crypto means is adapted to enter into said part of the software which is encrypted in accordance with said first algorithm (g1), a third key (k3) intended to be employed in a third algorithm (g3) for scrambling of said part of the software prior to its transfer to said external unit, wherein said external unit comprises descrambling means to descramble in accordance with a fourth algorithm (g4) and a fourth key (k4) said part of the software being encrypted in accordance with said first algorithm (g1), and which, prior to said first transfer session, is scrambled by said host computer according to said third algorithm (g3) and transferred to said external unit in said first transfer session, said third key (k3) used by said host computer in said scrambling being based on a number randomly selected for the respective transfer session and preferably provided by a number generator in said external unit, and said fourth key (k4) used by said descramble means in said external unit based on said number randomly selected, said fourth algorithm (g4) being the inverse algorithm of said third algorithm (g3).

23. A device according to claim 22, wherein said external unit further comprises:

scrambler means to scramble, prior to said second transfer session, in accordance with a fifth algorithm (g5) and a fifth key (k5), said result produced in said external unit on the basis of said part of the software which said external unit has decrypted in accordance with said second algorithm (g2), said fifth key (k5) used by said scrambler means to scramble being based on a number which is randomly selected for the respective transfer session and produced by a number generator in said external unit, said host computer being capable of descrambling in accordance with a sixth algorithm (g6) and a sixth key (k6), said result produced in said external unit for further utilization in said host computer, said result prior to said second transfer session being scrambled according to said fifth algorithm (g5) by means of said scrambler means in said external unit and transferred to the computer in said second transfer session, said sixth key (k6) being based on the same randomly selected number as that for said fifth key (k5), and said sixth algorithm (g6) being the inverse algorithm of said fifth algorithm (g5).

24. A device according to claim 16, wherein said external unit comprises adapter means and a separate article, being made tamper-proof, in or on which electronic circuits are disposed which at least comprise said external unit processor and computer readable memory and which is arranged such that a communication channel can be established between the circuits of said separate article and said host computer when said separate article is inserted into a slot in said adapter means, or in any other way is connected to said adapter means, said second algorithm (g2) and said private second key (k2) preferably being stored in such a way in said memory that they cannot be read by other means than said external unit processor of said separate article and never become available outside said separate article.

25. A device according to claim 24, wherein said separate article takes the form of a small substrate plate, such as a plastic card, having the size of a usual credit card, or Smart Card, said adapter means then comprising a card reader station for said substrate plate which optionally may be incorporated with said host computer or a peripheral unit connected thereto.

26. A device according to claim 24, wherein said separate article takes the form of an electronic circuit card adapted to be placed in a card position or slot provided in said host computer for extension cards, the circuit card, in the case of a portable host computer, being configured in accordance with one of the standard designs used for such insertable cards, such as the PCMCIA standard.

27. A device according to claim 24, wherein said separate article takes the form of an electronic blind plug, or the like, said adapter means then comprising an input-output terminal of said host computer.

28. A method of preventing unauthorized utilization of software in a computer, comprising the steps of:

encrypting only a part of the software in accordance with a first algorithm (g1) and a public first key (k1);

storing a second algorithm (g2) and a private second key from said public first key (k1) in an external unit having a computer readable storage medium and a processor, said external unit adapted to be connected to the computer; and decrypting said encrypted part of the software using said second algorithm (g2) and said private second key (k2).

29. A device for the preparation of software to be utilized in a computer only with a corresponding authorization, comprising:

determining means for determining a public private key to be used by the computer to decrypt only a part of the software in accordance with a decryption algorithm;

an external unit connected to the computer, wherein said decryption algorithm and said private key are stored in said external unit and encrypting means for encrypting only said part of the software in accordance with an encryption algorithm and another private public key different from said public private key determined by said determining means.

30. A device for making authorized utilization of software in a computer possible, comprising:

a device including crypto means for effecting the encryption of only a part of the software in accordance with a first algorithm (g1) and a public first key (k1), and an external unit adapted to be connected to the computer, said external unit comprising a processor and a computer readable storage medium for storing a second algorithm (g2) and a private second key (k2), and being disposed to execute decryption of said encrypted part of the software in accordance with said second algorithm (g2) and said private second key (k2), and generator means to provide said second algorithm (g2) and said private second key (k2) intended to be employed in said decryption in accordance with said second algorithm (g2), said private second key (k2) being different from said public first key (k1) employed by said crypto means in the execution of said encryption of said part of the software in accordance with said first algorithm (g1), said device comprising a computer to serve as a host computer for said external unit, and wherein said external unit comprises decryption means for decrypting said part of the software in accordance with said second algorithm (g2) and said private second key (k2) produced by said generator means.

\* \* \* \* \*